United States Patent [19]
Lew

[11] Patent Number: 5,123,285
[45] Date of Patent: Jun. 23, 1992

[54] PIEZO ELECTRIC IMPULSE SENSOR

[76] Inventor: Hyok S. Lew, 7890 Oak St., Arvada, Colo. 80005

[21] Appl. No.: 497,904

[22] Filed: Mar. 23, 1990

Related U.S. Application Data

[63] Continuation-in-part of Ser. No. 448,929, Dec. 12, 1989, Pat. No. 5,054,322.

[51] Int. Cl.$^5$ .............................................. G01F 1/32
[52] U.S. Cl. .................................................. 73/861.22
[58] Field of Search ............ 73/861.22, 861.23, 861.24, 73/851.21, 861.18, DIG. 4, 861.19

[56] References Cited

U.S. PATENT DOCUMENTS

| | | | |
|---|---|---|---|
| 4,699,012 | 10/1987 | Lew et al. | 73/DIG. 4 |
| 4,803,870 | 2/1989 | Lew | 73/861.22 |
| 4,976,156 | 12/1990 | Lew | 73/DIG. 4 |
| 4,986,134 | 1/1991 | Lew | 73/861.24 |

Primary Examiner—Hezron E. Williams
Assistant Examiner—Louis M. Arana

[57] ABSTRACT

An impulse sensor comprises a container vessel with a first cavity with an end wall, from which a force receiving member having an axially disposed elongated cavity extends; a transducer retainer member disposed in the first cavity in an affixed arrangement and having a second cavity with a deflective wall containing at least one Piezo electric element in a squeezed arrangement; and a force transmitting member anchored to and extending from the deflective wall of the second cavity, which force transmitting member extends through the end wall of the first cavity and into the elongated cavity included in the force receiving member and is secured to the closed end of the elongated cavity at the extremity thereof; wherein an impulse or force laterally exerted to the force receiving member changes the level of squeezing on the Piezo electric element and generates an electromotive force from the Piezo electric element.

20 Claims, 3 Drawing Sheets

PIEZO ELECTRIC IMPULSE SENSOR

This is a continuation-in-part application to patent application Ser. No. 448,929 entitled "Piezo Electric Motion Sensor" filed on Dec. 12, 1989 and now U.S. Pat. No. 5,054,322.

BACKGROUND OF THE INVENTION

In many cases of the industrial instrumentions requiring a measurement of impulses or forces, the impulse sensor is exposed to an adverse environment of gaseous or liquid medium which will destroy the transducer element included in the impulse sensor when the transducer element is exposed thereto. One of the most interesting application of the impulse sensor technology is the vortex sensor employed in constructing a vortex shedding flowmeter, wherein the vortex sensor must have a very high sensitivity to detect very weak vortices shed from the vortex generating bluff body at low fluid velocities and, at the same time, the transducer element included in the vortex sensor has to be protected from the fluid medium, of which flow rates is being measured. There are a few good vortex sensors available at the present time, which have a high sensitivity and rugged structure as well as a high cost of manufacturing. The present invention teaches an impulse sensor with a very high sensitivity and extreme ruggedness, that is inexpensive to manufacture.

BRIEF SUMMARY OF THE INVENTION

The primary object is to provide an impulse sensor comprising a circular cylindrical shell Piezo electric element retained in a squeezing relationship within a circular hole with open circumference included in a transducer retainer member that is fixedly disposed within a cavity included in the transducer container vessel having a tubular force receiving member with a closed end extending therefrom, wherein an elongated force transmitting member extending from one side of the circular hole retaining the shell Piezo electric element coaxially extends into the tubular force receiving member in a clearance relationship and is affixed to the closed end of the tubular force receiving member at the extremity thereof; whereby an impulse or force laterally exerted to the tubular force receiving member in directions generally perpendicular to the central axis of the circular cylindrical shell Piezo electric element changes the level of the squeezing on the shell Piezo electric element, which action generates an electric potential difference between the inner and outer cylindrical surfaces of the shell Piezo electric element.

Another object is to provide an impulse sensor described by the aforementioned primary object of the present invention, that further includes another circular cylindrical shell Piezo electric element retained within another circular hole with open circumference included in the transducer retainer member, wherein the two shell Piezo electric elements are disposed on a reference plane including the central axis of the combination of the elongated force transmitting member and the tubular force receiving member in an axisymmetric arrangement about an axis disposed on the reference plane and intermediate the two shell Piezo electric elements; whereby two electrical signals respectively generated by the two shell Piezo electric elements can be combined in such a way that noises are cancelled therebetween and a resultant electrical signal representing the impulse or force is obtained.

A further object is to provide an impulse sensor described by the aforementioned primary object of the present invention, that further includes another circular cylindrical shell Piezo electric element disposed within another circular hole with open circumference included in the transducer retainer member, wherein the two shell Piezo electric elements are disposed in a symmetric arrangement about a reference plane including the central axis of the combination of the elongated force transmitting member and the tubular force receiving member; whereby two electrical signals respectively generated by the two shell Piezo electric elements can be combined in such a way that noises are cancelled therebetween and a resultant electrical signal representing the impulse or force is obtained.

Yet another object is to provide an impulse sensor comprising a planar Piezo electric element retained in a squeezed relationship between two partially split halves of a transducer retainer member that is fixedly disposed within a cavity included in the transducer container vessel having a tubular force receiving member with a closed end extending therefrom, wherein an elongated force transmitting member extending from one of the two partially split halves of the transducer retainer member coaxially extends into the tubular force receiving member in a clearance relationship and is affixed to the closed end of the tubular force receiving member at the extremity thereof; whereby an impulse or force laterally exerted on the tubular force receiving member in directions generally perpendicular to a reference plane including the planar Piezo electric element changes the level of squeezing on the planar Piezo electric element, which action generates an electric potential difference between the two opposite sides of the planar Piezo electric element.

Yet a further object is to provide an impulse sensor comprising a transducer retainer member including two partially split halves and an elongated force transmitting member extending through a gap between the two partially split halves of the transducer retainer member, which transducer retainer member is fixedly disposed within a cavity included in the transducer container vessel having a tubular force receiving member with a closed end extending therefrom, wherein the elongated force transmitting member coaxially extends into the tubular force receiving member in a clearance relationship and is affixed to the closed end of the tubular force receiving member at the extremity thereof, and two planar Piezo electric elements are respectively disposed in squeezed relationship on the two opposite sides of the elongated force transmitting member and intermediate the two partially split halves of the transducer retainer member; whereby two electrical signals respectively generated by the two planar Piezo electric elements can be combined in such a way that noises are cancelled therebetween and a resultant electrical signal representing the impulse or force laterally exerted on the tubular force receiving member is obtained.

Still another object is to provide an impulse sensor comprising a transducer retainer member having a stub tubular extremity partially split into two halves that retains a circular cylindrical shell Piezo electric element in a squeezed relationship within the stub tubular extremity of the transducer retainer member which is fixedly disposed within a cavity included in a transducer container vessel having a tubular force receiving member with a closed end extending therefrom in a direction coaxial to the central axis of the shell Piezo electric element, wherein an elongated force transmitting member extending from one of the two partially split halves of the stub tubular extremity of the transducer retainer member coaxially extends into the tubular force receiving member in a clearance relationship and is affixed to the closed end of the tubular force receiving member at the extremity thereof; whereby an impulse or force laterally exerted on the tubular force receiving member in directions perpendicular to a reference plane dividing the two partially split halves of the transducer retainer member from one another changes the level of squeezing on the shell Piezo electric element, which action generates an electric potential difference between the inner and outer cylindrical surfaces of the shell Piezo electric element.

Still a further object is to provide an impulse sensor comprising a transducer retainer member including a tubular section partially split into two halves, which retains a circular cylindrical shell Piezo electric element within the tubular section thereof in a squeezing relationship and also retains an elongated force transmitting member with a planar extremity trapped in a planar gap between the two partially split halves of the transducer retainer member that is fixedly disposed within a cavity included in the transducer container vessel having a tubular force receiving member with a closed end extending therefrom in a direction coaxial to the central axis of the shell Piezo electric element, wherein the elongated force transmitting member coaxially extends into the tubular force receiving member in a clearance relationship and is affixed to the closed end of the tubular force receiving member at the extremity thereof; whereby an impulse or force exerted on the tubular force receiving member in direction perpendicular to a reference plane dividing the two partially split halves of the transducer retainer member from one another and/or a torque about an axis parallel to the central axis of the shell Piezo electric element and exerted on the tubular force receiving member generate an electric potential difference between the inner and outer cylindrical surfaces of the shell Piezo electric element.

Yet still another object is to provide an impulse sensor comprising a single planar Piezo electric element with two separate electrodes disposed on two opposite sides of a reference plane or two planar Piezo electric elements disposed on the two opposite sides of the reference plane, which Piezo electric element or elements is disposed within a cavity included in a transducer retainer member on a plane perpendicular to the reference plane and parallel to a thin wall of the cavity of the transducer retainer member and pressed against the thin wall of the cavity of the transducer retainer member that is fixedly disposed within a cavity included in a transducer container vessel having a tubular force receiving member with a closed end extending therefrom in a direction perpendicular to the plane including the planar Piezo electric element; wherein an elongated force transmitting member extending from the thin wall of the cavity included in the transducer retainer member coaxially extends into the tubular force receiving member in a clearance relationship and is affixed to the closed end of the tubular force receiving member at the extremity thereof; whereby an impulse or force exerted on the tubular force receiving member in directions perpendicular to the reference plane alternatively compresses and decompresses the two halves of the planar Piezo electric element disposed on the two opposite sides of the reference plane, which action generates two electrical signals respectively from the two halves of the planar Piezo electric element, whereby the two electrical signals can be combined in such a way that noises are cancelled therebetween and a resultant electrical signal representing the impulse or force is obtained.

These and other objects of the present invention will become clear as the description thereof progresses.

BRIEF DESCRIPTION OF THE FIGURES

The present inventions may be described with a greater clarity and specificity by referring to the following figures.

DESCRIPTION OF THE ILLUSTRATED EMBODIMENTS

Figures 1, 2:
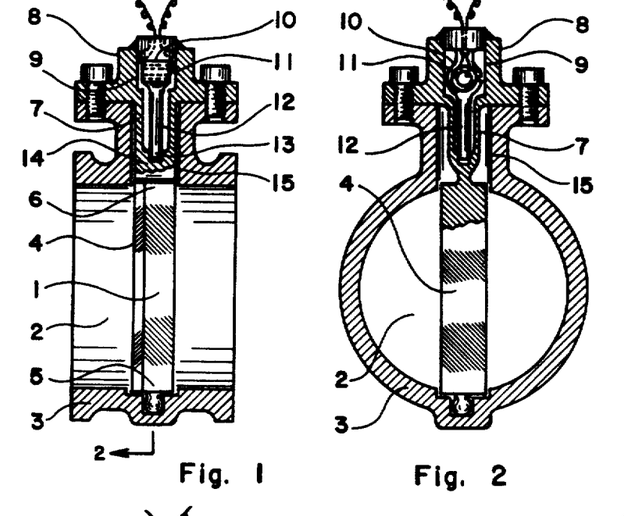
FIG. 1 illustrates a cross section of an embodiment of the vortex generator-sensor employing the impulse sensor of the present invention.
FIG. 2 illustrates another cross section of the vortex generator-sensor shown in FIG. 1.

In FIG. 1 there is illustrated a cross section of an embodiment of the vortex flowmeter comprising a vortex generator-sensor 1 disposed across a flow passage 2 included in the flowmeter body 3. The vortex generator-sensor 1 includes a vortex generating cylindrical bluff body 4 with one extremity 5 secured to the wall of the flow passage 2 and the other extremity 6 extending to a tubular section 7 that terminates as the transducer container vessel 8 rigidly affixed to the flowmeter body 3. The transducer container vessel 8 includes a cavity 9 that contains a transducer retainer member 10 retaining at least one Piezo electric element 11. An elongated force transmitting member 12 extends from the transducer retainer member 10 and coaxially engages the tubular section 7 in a clearance relationship, wherein the extremity 13 of the elongated force transmitting member 12 is affixed to the closed end 14 of the tubular section 7. It should be noticed that the tubular section 7 is engaging and extending through a hole disposed through the wall of the flow passage 2 in a clearance relationship.

In FIG. 2 there is illustrated another cross section of the vortex flowmeter shown in FIG. 1, which cross section taken along plane 2—2 as shown in FIG. 1 shows the tubular section 7, connecting the vortex generating bluff body 4 to the transducer container vessel 8 as well as a Piezo electric element 11 such as a circular cylindrical shell Piezo electric element retained by the transducer retainer member 10. The tubular section 7 has reduced cross section areas providing an additional lateral deflectivity, which provides a higher sensitivity in vortex sensing because of the enhanced transmission of the fluid dynamic force created by the vortex shedding and experienced by the bluff body 4 to the elongated force transmitting member 12. Of course, the tubular section 7 can have the same constant cross section as that of the bluff body 4 when the overwhelming issue is the strength of the flowmeter rather than the sensitivity.

Figure 3:
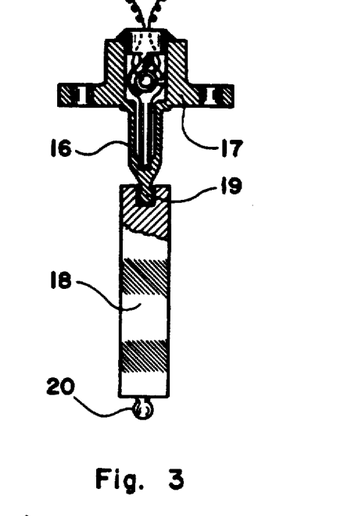
FIG. 3 illustrates another embodiment of the vortex generator-sensor.

In FIG. 3 there is illustrated another embodiment of the vortex generator-sensor having a construction similar to the element 1 shown in FIG. 1 with one exception that is the tubular force receiving member 16 extending from the transducer container vessel 17 and connected to one extremity of the bluff body 18 by a mechanical coupling 19 such as a ball and socket joint, plug and socket or threaded joint. The other extremity of the bluff body 18 includes a securing means 20 for securing it to the wall of the flow passage, which securing means may comprise a ball or plug engaging a socket included in the wall of flow passage or threaded, press-fit or welded fastening to the wall of the flow passage. It should be noticed that the tubular force receiving member 16 has the same construction and same function as that of the tubular section 7 shown in FIG. 1 with the exception that the tubular force receiving member 16 can now be structurally separated from the bluff body. The additional flexibility provided by the mechanical coupling further enhances the sensitivity in the vortex sensing.

Figure 4:
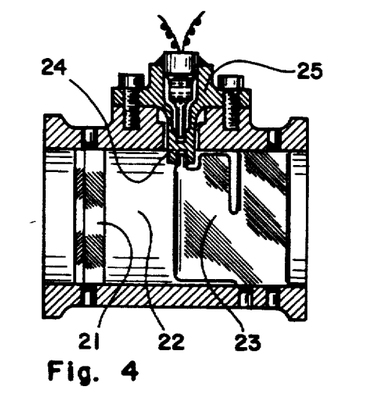
FIG. 4 illustrates a cross section of an embodiment of the vortex flow-meter comprising a vortex generator and a vortex sensor employing the impulse sensor of the present invention.

In FIG. 4 there is illustrated a cross section of another embodiment of the vortex flowmeter that comprises a vortex generating bluff body 21 disposed across a flow passage 22 and a vortex sensing planar member 23 disposed downstream of the bluff body 21 and across the flow passage 22, wherein at least one extremity of the planar member 23 is secured to the wall of the flow passage 22 and a deflective portion of the planar member 23 is connected to the tubular force receiving member 24 extending from the transducer container vessel 25.

Figure 5:
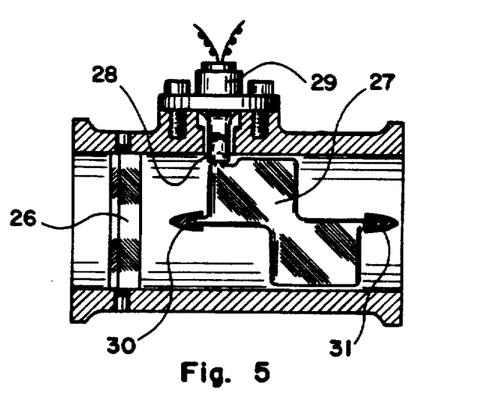
FIG. 5 illustrates a cross section of another embodiment of the vortex flowmeter comprising a vortex generator and a vortex sensor employing the impulse sensor of the present invention.

In FIG. 5 there is illustrated a cross section of another embodiment of the vortex flowmeter comprising a vortex generating bluff body 26 and a vortex sensing planar member 27 with one extremity connected to the tubular force receiving member 28 extending from the transducer container vessel 29. The planar member 27 is pivotably supported by a pair of pylons 30 and 31 disposed across the flow passage and affixed to the wall of the flow passage. The leading edges of the two halves of the planar member 27 respectively located on the two opposite sides of the pivot axis of the planar member 27 are off set from one another by a distance equal to one half or one half plus an integer times the wave length of sinuating stream lines created by the vortex shedding from the bluff body 26, whereby the fluid dynamic force created by vortices generates an alternating torque about an axis generally parallel to the central axis of the flow passage on the planar member 27. The vortex flowmeters shown in FIGS. 1, 3, 4 and 5 operates on the following principles: The volume flow rate of fluid moving through the flow passage is determined from the frequency of alternating electrical signal generated by the transducer as the vortex shedding frequency is proportional to the velocity of fluid, while the dynamic pressure of fluid flow equal to one half of the fluid density times the square of the fluid velocity is determined from the amplitude of the alternating electrical signal generated by the transducer as there exist a proportionality relationship therebetween. The mass flow rate is determined from the ratio of the dynamic pressure to the fluid velocity, while the fluid density is determined as the ratio of mass flow rate to the volume flow rate. The transducer packages employed in the vortex flowmeters shown in FIGS. 1, 3, 4 and 5 can be any one of many different embodiments of the impulse sensor taught by the present invention.

Figure 6:
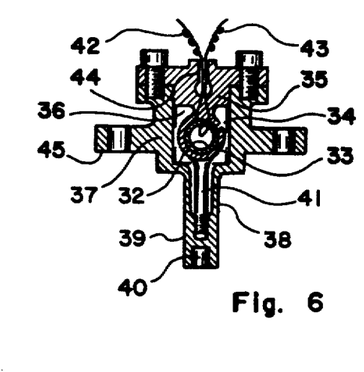
FIG. 6 illustrates a cross section of an embodiment of the impulse sensor of the present invention comprising a single circular cylindrical shell Piezo electric element.

In FIG. 6 there is illustrated a cross section of an embodiment of the impulse sensor of the present invention comprising a circular cylindrical shell Piezo electric element 32 that is retained in a squeezed relationship within a circular hole 33 with open circumference having a cut 34 through the cylindrical wall thereof, which circular hole 33 is included in an extremity of the transducer retainer member 35 of circular cylindrical shape plugging up the open end of the circular cylindrical cavity 36 included in the transducer container vessel 37 that includes a tubular force receiving member 38 coaxially extending from the closed end of the cavity 36 included in the transducer container vessel 37, which tubular force receiving member 38 has a closed end 39 including a mechanical coupling means 40 that can be a socket, a plug, a threaded fastener or joint requiring a weld connection. Of course, the tubular force receiving member 38 may be structurally extended to form a bluff body as exemplified by the embodiment shown in FIG. 1 or to form a planar member experiencing an impulse or force such as the lift force generated by vortices. An elongated force transmitting member 41 extends from a portion of the cylindrical wall of the circular opening 33 in a direction generally perpendicular to the central axis of the circular cylindrical shell Piezo electric element 32 and coaxially extends into the tubular force receiving member 38 in a clearance relationship wherein the extremity of the elongated force transmitting member 41 is secured to the closed end 39 of the tubular force receiving member 38. The two lead wires 42 and 43 respectively extending from the inner and outer cylindrical shell electrodes of the circular cylindrical shell Piezo electric element 32 are routed through a hole 44 disposed through the transducer retainer member 35. For the brevity of the illustration, the cylindrical shell electrodes anchoring the lead wires 42 and 43 as well as a cylindrical shell insulator disposed between the circular cylindrical shell Piezo electric element 32 and the inner cylindrical surface of the circular hole 33 are not shown in the particular illustration. The transducer container vessel 37 includes a fastening means 45 such as a flange, threaded element or weld-connecting element for securing the transducer container vessel 37 to a support such as the flowmeter body. The combination of the tubular force receiving member 38 and the elongated force transmitting member 41 provides a section with an enhanced lateral deflectivity between the vortex sensing planar member or bluff body and the transducer container vessel, whereby an impulse or force laterally exerted to the extremity of the tubular force receiving member in directions perpendicular to a reference plane including the central axis of the circular cylindrical shell Piezo electric element 32 alters the level of squeezing on the shell Piezo electric element 32, which action generates an electric potential difference between the inner and outer cylindrical surfaces of the shell Piezo electric element 32, that represents the impulse or force received by the tubular force receiving member. The electrical signals transmitted by the two lead wires 42 and 43 can be combined differentially or additively in such a way that noises are cancelled therebetween and a resultant electrical signal representing the impulse or force is obtained.

Figure 7:
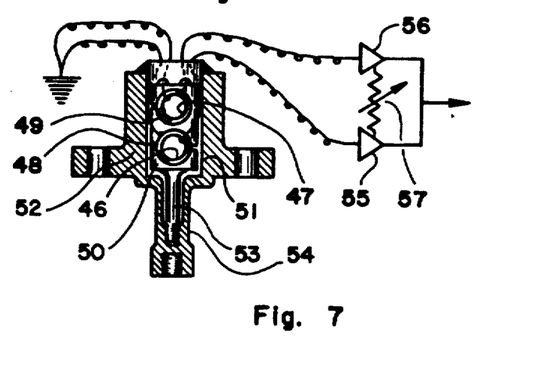
FIG. 7 illustrates a cross section of an embodiment of the impulse sensor comprising a pair of circular cylindrical shell Piezo electric elements.

In FIG. 7 there is illustrated a cross section of an embodiment of the impulse sensor of the present invention including a pair of circular cylindrical shell Piezo electric elements 46 and 47 respectively retained in squeezed relationship within two circular holes 48 and 49 with open circumference included in the transducer retainer member 50 of circular cylindrical shape, that engages the circular cylindrical cavity 51 included in the transducer container vessel 52 coaxially in a clearance relationship. The central axis of the two shell Piezo electric elements 46 and 47 are disposed on a reference plane including the central axis of the transducer retainer member 50 and the cuts opening the circumference of the two circular holes 48 and 49 extend to two opposite cylindrical side of the transducer retainer member 50, that is secured to the transducer container vessel 52 at one extremity. The elongated force transmitting member 53 extends from the other extremity of the transducer retainer member 50 opposite to the secured extremity thereof and coaxially extends into the tubular force receiving member 54 coaxially extending from the end wall of the cavity 51 included in the transducer container vessel 52, wherein the extremity of the elongated force transmitting member 53 is secured to the closed end of the tubular force receiving member 54. The inner cylindrical surface electrode of the shell Piezo electric element 46 and the outer cylindrical surface electrode of the shell Piezo electric element 47 are respectively connected to two amplifiers 55 and 56 including means 57 for signal balancing therebetween, which may comprise at least one variable resistor or variable gain control of the amplifier. The other electrodes of the shell Piezo electric elements 46 and 47 not connected to the amplifiers 55 and 56 may be grounded. The impulse or force perpendicular to the reference plane received by the tubular force receiving member 54 alternatively increases and decreases the squeezings on the shell Piezo electric elements 46 and 47 and generates two electrical signals respectively from the two shell Piezo electric elements 46 and 47, which two electrical signals can be combined by the combination of the amplifiers 55 and 56 and the signal balancing means 57 in such a way that noises are cancelled therebetween and a resultant electrical signal representing the impulse or force is obtained. If the two shell Piezo electric elements 46 and 47 are oppositely polarized, the two amplifiers 55 and 56 should be connected to the same side cylindrical surface electrodes of the shell Piezo electric elements 46 and 47. Of course, a combination of a noninverting and inverting amplifiers can be employed in place of the identical amplifiers 55 and 56 with appropriately modified lead wire connections to the shell Piezo electric elements 46 and 47.

Figure 8:
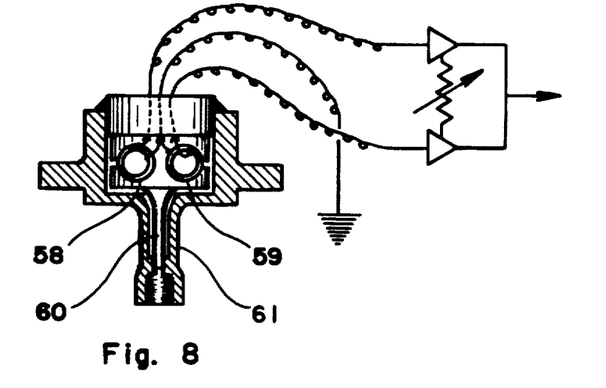
FIG. 8 illustrates a cross section of another embodiment of the impulse sensor comprising a pair of circular cylindrical shell Piezo electric elements.

In FIG. 8 there is illustrated a cross section of another embodiment of the impulse sensor comprising a pair of circular cylindrical shell Piezo electric elements 58 and 59 disposed in an arrangement quite similar to the embodiment shown in FIG. 7 and operating on the same principles as those described in conjunction with FIG. 7 with one exception that is the location of the two shell Piezo electric elements 58 and 59 which are now disposed on the two opposite sides of the reference plane including the central axis of the combination of the elongated force transmitting member 60 and the tubular force receiving member 61 in a symmetric arrangement about the reference plane.

Figure 9:
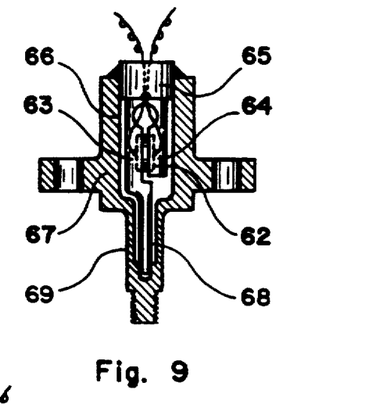
FIG. 9 illustrates a cross section of an embodiment of the impulse sensor comprising a planar Piezo electric element.

In FIG. 9 there is illustrated a cross section of an embodiment of the impulse sensor comprising a planar Piezo electric element 62 that is retained in a squeezed relationship between two partially split halves 63 and 64 of the transducer retainer member 65 of a circular cylindrical shape, that engages coaxially the circular cylindrical cavity 66 included in the transducer container vessel 67 in a clearance relationship, wherein the unsplit extremity of the transducer retainer member 65 is secured to the transducer container vessel 67. The elongated force transmitting member 68 extending from the extremity of one of the two partially split halves 63 and 64 coaxially extends into the tubular force receiving member 69 coaxially extending from the transducer container vessel 67, wherein the extremity of the elongated force transmitting member 68 is secured to the closed end of the tubular force receiving member 69. An impulse or force perpendicular to a reference plane dividing the two partially split havles 63 and 64 of the transducer retainer member 65 received by the tubular force receiving member 69 compresses or decompresses the planar Piezo electric element 62 and generates an electrical signal representing the impulse or force therefrom.

Figures 10, 11, 12, 13, 14:
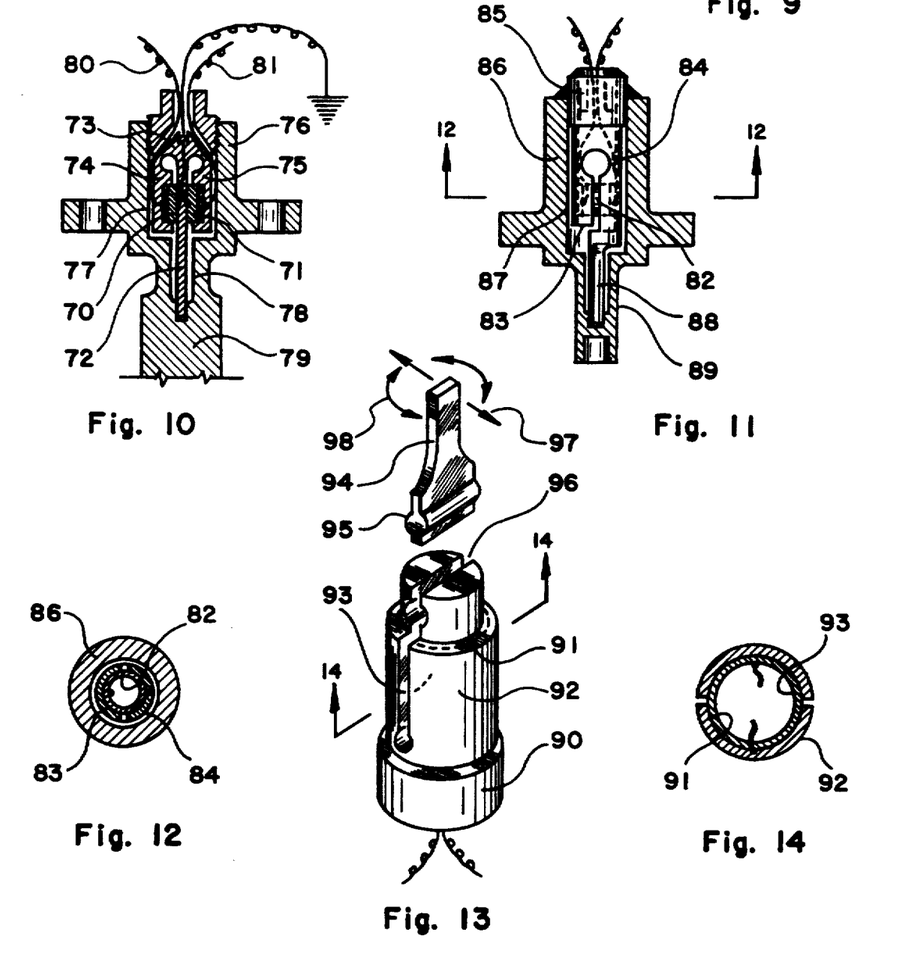
FIG. 10 illustrates a cross section of an embodiment of the impulse sensor comprising a pair of planar Piezo electric elements.
FIG. 11 illustrates a cross section of an embodiment of the impulse sensor comprising a circular cylindrical shell Piezo electric element disposed coaxially to the impulse sensor package.
FIG. 12 illustrates another cross section of the impulse sensor shown in FIG. 11.
FIG. 13 illustrates an embodiment of the transducer retainer member including a circular cylindrical shell Piezo electric element disposed in a coaxial arrangement.
FIG. 14 illustrates a cross section of the transducer retainer member shown in FIG. 13.

In FIG. 10 there is illustrated a cross section of an embodiment of the impulse sensor comprising a pair of planar Piezo electric elements 70 and 71 respectively disposed on the two opposite sides of the elongated force transmitting member 72 extending from the unsplit extremity of the transducer retainer member 73 and through the gap between the two partially split halves 74 and 75 of the transducer retainer member 73, wherein each of the two planar Piezo electric elements 70 and 71 is squeezed between each of the two opposite sides of the elongated force transmitting member 72 and each of the two partially split halves 74 and 75 of the transducer retainer member 73 that coaxially engages the cavity 77 included in the transducer container vessel 76 in a clearance relationship, wherein the unsplit extremity thereof is secured to the transducer container vessel 76. The elongated force transmitting member 72 engages in clearance relationship a blind hole 78 coaxially included in the force receiving member 79 extending from the transducer container vessel 76 in a coaxial arrangement thereto, wherein the extremity of the elongated force transmitting member 72 is secured to the closed end of the hole 78. An impulse or force perpendicular to a reference plane dividing the two partially split halves 74 and 75 of the transducer retainer member 73 from one another received by the force receiving member 79 alternatively compresses and decompresses the two planar Piezo electric elements 70 and 71, and generates two electrical signals respectively from the two planar Piezo electric elements 70 and 71, which are transmitted by the two lead wires 80 and 81 respectively extending from electrodes included in the two planar Piezo electric elements 70 and 71. The two planar Piezo electric elements 70 and 71 may be disposed in such a way that the polarities thereof point the same direction or two opposite directions. The two electrical signals respectively transmitted through the two lead wires 80 and 81 can be combined by a pair of identical amplifiers as shown in FIG. 7 or a combination of a noninverting and inverting amplifiers with a signal balancing means therebetween in such a way that noises are cancelled therebetween and a resultant electrical signal representing the impulse or force is obtained. The other electrodes of the two planar Piezo electric elements 70 and 71 not connected to the amplifiers may be grounded.

In FIG. 11 there is illustrated a cross section of an embodiment of the impulse sensor comprising a circular cylindrical shell Piezo electric element 82 coaxially retained in a squeezed relationship within a circular cylindrical cavity 83 having a partially split cylindrical wall 84, that is included in one extremity of the transducer retainer member 85 of circular cylindrical shape secured to the transducer container vessel 86 at the other extremity thereof. The transducer retainer member 85 engages a circular cylindrical cavity 87 included in the transducer container vessel 86 in a coaxial arrangement in a clearance relationship. The elongated force transmitting member 88 extending from one of the two partially split halves of the cylindrical wall 84 coaxially engages the tubular force receiving member 89 coaxially extending from the transducer container vessel 86, wherein the extremity of the elongated force transmitting member 88 is secured to the closed end of the tubular force receiving member 89. An impulse or force laterally exerted on the tubular force receiving member 89 in directions perpendicular to a reference plane dividing the two partially split halves of the cylindrical wall 84 from one another increases or decreases the level of squeezing on the shell Piezo electrical element 82 and generates an electric potential difference between the inner and outer cylindrical shell electrodes of the shell Piezo electric element 82, that represents the impulse or force received by the tubular force receiving member 89.

In FIG. 12 there is illustrated another cross section of the impulse sensor shown in FIG. 11 which cross section taken along plane 12—12 as shown in FIG. 11 shows the shell Piezo electric element 82 confined within a circular cylindrical cavity 83 with a partially split cylindrical wall 84.

In FIG. 13 there is illustrated a perspective view of an embodiment of the transducer retainer member 90 of circular cylindrical shape, which includes a circular cylindrical cavity 91 with a partially split cylindrical wall 92 disposed in a coaxial arrangement thereto. A circular cylindrical shell Piezo electric element 93 is disposed in a squeezed relationship within the circular cylindrical cavity 91. An elongated force transmitting member 94 with a planar extremity 95 trapped in a retained relationship between a gap 96 between the two partially split halves of the cylindrical wall 92 extends from the transducer retainer member 90 in a coaxial arrangement. An impulse or force 97 acting in directions lateral to the elongated force transmitting member 94 and experienced thereby, or a torque 98 about an axis parallel to the central axis of the shell Piezo electric element 93 experienced by the elongated force transmitting member 94 changes the level of squeezing on the shell Piezo electric element 93 and generates an electric potential difference between the inner and outer cylindrical surface electrodes of the shell Piezo electric element 93.

In FIG. 14 there is illustrated a cross section of the transducer retainer member shown in FIG. 13, which cross section taken along plane 14—14 as shown in FIG. 13 shows the shell Piezo electric element 93 retained within the circular cylindrical cavity 91 with a partially split cylindrical wall 92.

Figures 15, 16, 17, 18:
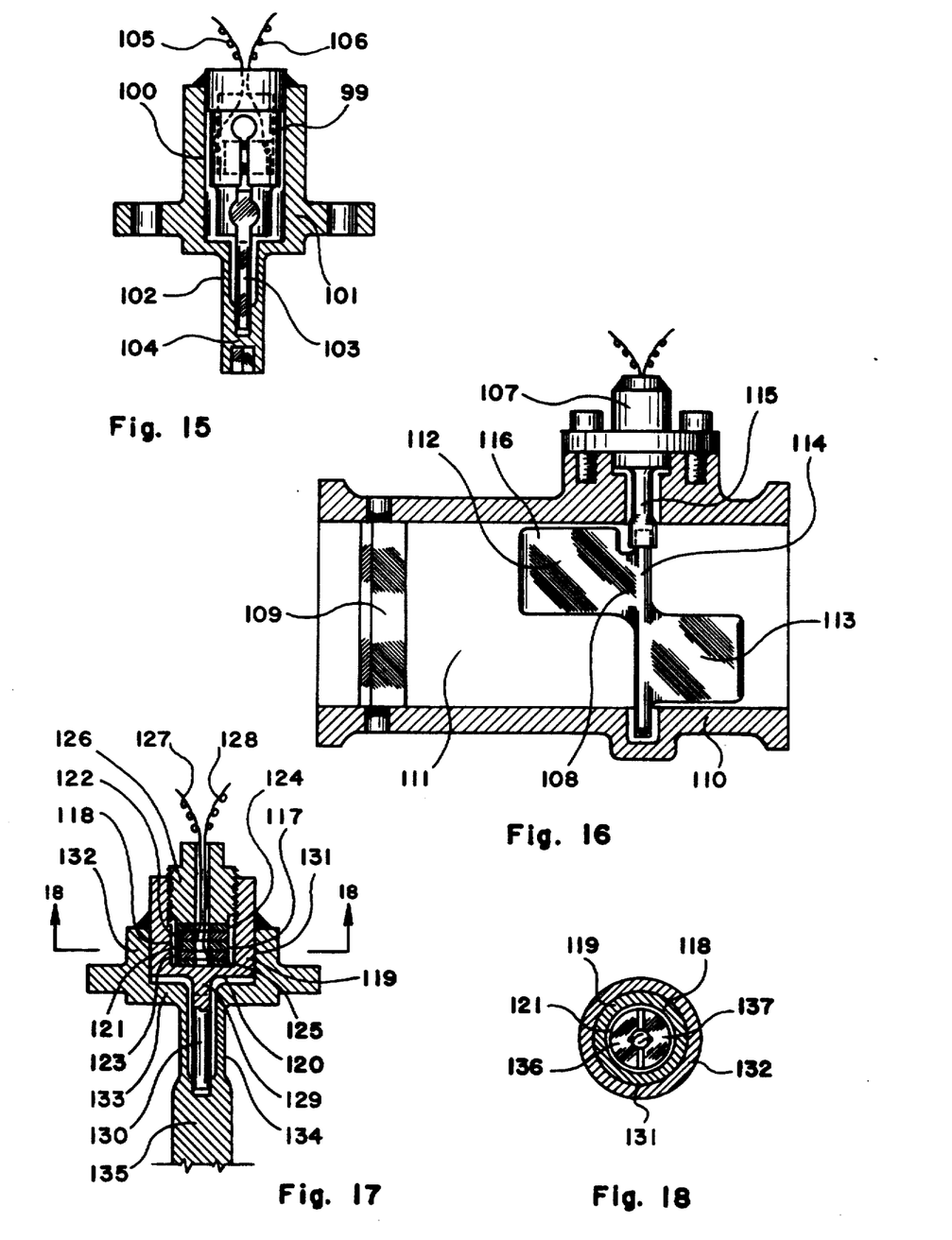
FIG. 15 illustrates a cross section of an impulse sensor employing the transducer retainer member shown in FIG. 13.
FIG. 16 illustrates a cross section of an embodiment of the vortex flow-meter comprising a vortex generator and a vortex sensor employing the impulse sensor shown in FIG. 15.
FIG. 17 illustrates a cross section of an embodiment of the impulse sensor comprising a planar Piezo electric element with two connected or two split halves coaxially disposed to the impulse sensor package.
FIG. 18 illustrates another cross section of the impulse sensor shown in FIG. 17.

In FIG. 15 there is illustrated a cross section of an embodiment of the impulse and/or torque sensor employing the transducer retainer member shown in FIG. 13. The transducer retainer member 99 identical to that shown in FIG. 13 engages coaxially in a clearance relationship a circular cylindrical cavity 100 included in the transducer container vessel 101 that includes the tubular force receiving member 102 extending therefrom in a coaxial arrangement. The unsplit extremity 103 of the transducer retainer member 99 plugs up the open end of the cavity 100 included in the transducer container vessel 101 in an affixed arrangement. The elongated force transmitting member 103 extending from the transducer retainer member 99 coaxially extends into the tubular force receiving member 102 in a clearance relationship and is affixed to the closed end 104 of the tubular force receiving member 102 at the extremity thereof. The impulse sensor shown in FIG. 15 senses impulses acting in directions perpendicular to the central axis of the tubular force receiving member 102 as well as torques about the same central axis. The electrical signals supplied by the two lead wires 105 and 106 respectively extending from the inner and outer cylindrical surface electrodes of the shell Piezo electric element can be processed by the same arrangement as that described in conjunction with FIG. 6.

In FIG. 16 there is illustrated a cross section of an embodiment of the vortex flowmeter employing an impulse/torque sensor 107 having the same construction and operating principles as that shown in FIG. 15. The vortex sensor 108 disposed downstream of the vortex generating bluff body 109 is secured to the flowmeter body 110 in a pivotable arrangement about a pivot axis perpendicular to the central axis of the flow passage 111. The vortex sensor 108 includes two planar members 112 and 113 respectively extending from the pivot axis 114 in the two opposite directions parallel to the central axis of the flow passage 111 and respectively disposed on two opposite sides of the same central axis. The distance from the pivot axis 114 to the over-hanging edge of each of the two planar members should be equal to one half plus an integer times the wave length of sinuating stream lines created by the vortices shed from the bluff body 109, whereby the two planar members 112 and 113 respectively experience two vortex generated alternating lift forces acting in two opposite directions, which combination creates an alternating torque about the pivot axis 114. Of course, the pivot axis 114 must be connected to the force receiving member 115 by a torque transmitting coupling. As an alternative design, the impulse sensor 107 can be relocated to a position upstream to the particular position shown and the force receiving member 115 can be connected to a deflective portion of the vortex sensor such as the over-hanging corner 116 of the planar member 112.

In FIG. 17 there is illustrated a cross section of an embodiment of the impulse sensor comprising a Piezo electric transducer pack 117 disposed within a circular cylindrical cavity 118 included in the transducer retainer member 119 of a circular cylindrical shape on a plane parallel and adjacent to a thin wall 120 of the cavity 118. The Piezo electric transducer pack 117 includes a single planar Piezo electric element 121 straddling a reference plane including the central axis of the circular cylindrical cavity 118 or a pair of planar Piezo electric element 121 disposed on the two opposite sides of the reference plane, which arrangement of the planar Piezo electric element or elements are sandwiched between two electrode discs 122 and 123 respectively insulated from the wall of the cavity 118 by two insulator discs 124 and 125. The Piezo electric transducer pack 117 is pressed against the thin wall 120 of the cavity 118 by a plug 126 threadedly engaging the open end of the cavity 118. The lead wires 127 and 128 extending from the electrodes of the Piezo electric transducer pack 117 are routed through a hole included in the plug 126 in a coaxial arrangement. The thin wall 120 includes a reinforcing rib 129 disposed diametrically thereacross on the reference plane, from which reinforcing rib 129 the elongated force transmitting member 130 disposed on the reference plane extends in a coaxial relationship to the transducer retainer member 119. The transducer retainer member 119 engages a circular cylindrical cavity 131 included in the transducer container vessel 132 in a coaxially fixed relationship. The end wall 133 of the cavity 131 includes the tubular force receiving member 134 extending coaxially therefrom. The elongated force transmitting member 130 coaxially extends into the tubular force receiving member 134 in a clearance relationship and is secured to the closed end 135 of the tubular force receiving member 134 at the extremity thereof. There should be a gap between the end wall 133 of the cavity 131 and the thin wall 120 of the cavity 118.

In FIG. 18 there is illustrated another cross section of the impulse sensor shown in FIG. 17, which cross section taken along plane 18-18 as shown in FIG. 17 shows the arrangement of the planar Piezo electric element 121 included in the impulse sensor. The planar Piezo electric element 121 may include a single circular planar Piezo electric disc sandwiched between the two electrode discs 122 and 123, each of which two electrode discs has a pair of electrodes 136 and 137 respectively disposed on the two opposite sides of the reference plane. The planar Piezo element 121 may include a pair of semicircular planar Piezo electric discs respectively disposed on the two opposite sides of the reference plane and respectively in contact with the split pair of electrodes 136 and 137 at each side thereof, wherein the polarities of the two semicircular planar Piezo electric discs may point the same direction or two opposite directions. Two electrodes disposed on the two opposite sides of the reference plane, which two electrodes may be disposed on the same side or respectively on two opposite sides of the planar Piezo electric disc or discs, can be respectively connected to two identical amplifiers with signal balancing means as shown in FIG. 7 or respectively to a noninverting amplifier and an inverting amplifier with signal balancing means therebetween, whereby noises are cancelled therebetween and a resultant electrical signal representing impulses laterally exerted on the force receiving member 134 is obtained. It should be mentioned that the end wall 133 of the cavity 131 can be made thick and rigid without sacrificing the sensitivity of the impulse sensor, as the deflective tubular section of the force receiving member enhances the transmission of the impulse or force from the force receiving member 134 to the thin wall 120 of the cavity 118.

While the principles of the present inventions have now been made clear by the illustrative embodiments, there will be many modifications of the structures, arrangements, proportions, elements and materials obvious to those skilled in the art, which are particularly adapted to the specific working environments and operating conditions in the practice of the invention without departing from those principles. It is not desired to limit the inventions to the particular illustrative embodiments shown and described and, accordingly, all suitable modifications and equivalents may be regarded as falling within the scope of the inventions as defined by the claims which follow.

The embodiments of the invention, in which an exclusive property or priviledge is claimed, are defined as follows:

1. An apparatus for detecting impulse comprising in combination:
    a) a container vessel including a first cavity with a wall including a force receiving member extending from the wall, wherein the force receiving member includes an elongated cavity extending through the wall and open to said first cavity;
    b) a transducer retainer member disposed within said first cavity and affixed to the container vessel at one extremity of the transducer retainer member away from said wall of the first cavity, said transducer retainer member including a second cavity with a deflective wall containing at least one Piezo electric element under pressure exerted by said deflective wall of the second cavity, said deflective wall anchoring a force transmitting member extending from said deflective wall and into said elongated cavity included in the force receiving member and secured to the force receiving member at an extremity thereof; wherein a lateral deflection of the force receiving member alters the pressure on the Piezo electric element exerted by said deflective wall; and
    c) at least one conductor wire extending from at least one electrode included in the Piezo electric element, wherein said conductor wire transmits an electromotive force generated by the Piezo electric element and representing impulse received by the force receiving member.

2. The combination as set forth in claim 1 wherein said combination includes another conductor wire extending from another electrode included in the Piezo electric element, wherein said one and another conductor wires respectively transmit two electromotive forces having opposite signs.

3. The combination as set forth in claim 2 wherein said combination includes an electric circuit means for combining said two electromotive forces respectively transmitted by said one and another conductor wires; wherein noises are cancelled between said two electromotive forces and a resultant electrical signal representing the impulse received by the force receiving member is obtained.

4. The combination as set forth in claim 2 wherein force receiving member includes a structural extension forming a vortex shedding bluff body of elongated cylindrical shape.

5. The combination as set forth in claim 2 wherein the force receiving member includes a structural extension forming a vortex sensing planar member.

6. The combination as set forth in claim 1 wherein said combination includes another Piezo electric element under pressure exerted by said deflective wall and at least another conductor wire extending from at least one electrode included in said another Piezo electric element; wherein a lateral deflection of the force receiving member alternatively increases and decreases the pressures on said one and another Piezo electric elements and generates two electromotive forces respectively from the two Piezo electric elements and respectively transmitted through the two conductor wires.

7. The combination as set forth in claim 6 wherein said combination includes an electric circuit means for combining said two electromotive forces respectively transmitted by said one and another conductor wires; wherein noises are cancelled between said two electromotive forces and a resultant electrical signal representing the impulse received by the force receiving member is obtained.

8. The combination as set forth in claim 6 wherein force receiving member includes a structural extension forming a vortex shedding bluff body of elongated cylindrical shape.

9. The combination as set forth in claim 6 wherein the force receiving member includes a structural extension forming a vortex sensing planar member.

10. The combination as set forth in claim 1 wherein said second cavity with a deflective wall containing said Piezo electric element comprises a circular cylindrical cavity with central axis generally perpendicular to the longitudinal axis of said elongated cavity included in the force receiving member, wherein cylindrical wall of said circular cylindrical cavity has a slit opening disposed axially parallel to the central axis of the circular cylindrical cavity and extending radially through the cylindrical wall, and said force transmitting member extends laterally from said cylindrical wall; and said at least one Piezo electric element has a shape of circular cylindrical shell retained within the circular cylindrical cavity in a squeezed arrangement.

11. The combination as set forth in claim 10 wherein said combination includes two conductor wires respectively extending from two electrodes respectively included in inner and outer cylindrical surfaces of the circular cylindrical shell Piezo electric element.

12. The combination as set forth in claim 10 wherein said combination includes another circular cylindrical shell Piezo electric element contained within another circular cylindrical cavity disposed parallel and adjacent to said a circular cylindrical cavity and having a radial cut through cylindrical wall thereof, and at least another conductor wire extending from at least one electrode included in said another circular cylindrical shell Piezo electric element; wherein central axes of the two circular cylindrical shell Piezo electric elements are disposed on a reference plane generally including the longitudinal axis of said elongated cavity included in the force receiving member and radial cuts respectively included in the cylindrical walls of the two circular cylindrical cavities are respectively disposed on two opposite sides of the reference plane.

13. The combination as set forth in claim 10 wherein said combination includes another circular cylindrical shell Piezo electric element contained within another circular cylindrical cavity disposed parallel and adjacent to said a circular cylindrical cavity and having a radial cut through cylindrical wall thereof, and at least another conductor wire extending from at least one electrode included in said another circular cylindrical shell Piezo electric element; wherein the two circular cylindrical shell Piezo electric elements are respectively disposed on two opposite sides of a reference plane generally including the longitudinal axis of said elongated cavity included in the force receiving member and the radial cuts respectively included in the cylindrical walls of the two circular cylindrical cavities are respectively disposed on the two opposite sides of said reference plane.

14. The combination as set forth in claim 1 wherein the second cavity with a deflective wall containing a Piezo electric element comprises a circular cylindrical cavity with central axis generally parallel to the longitudinal axis of said elongated cavity included in the force receiving member, wherein said circular cylindrical cavity has a cylindrical wall partially split into two halves and contains a circular cylindrical shell Piezo electric element therein in a squeezing arrangement; wherein the force transmitting member extends from one of the two partially split halves of the cylindrical wall of said circular cylindrical cavity.

15. The combination as set forth in claim 14 wherein said combination includes two conductor wires respectively extending from two electrodes respectively included in inner and outer cylindrical surfaces of the circular cylindrical shell Piezo electric element.

16. The combination as set forth in claim 1 wherein the second cavity with a deflective wall containing a Piezo electric element comprises a circular cylindrical cavity with central axis generally parallel to the longitudinal axis of said elongated cavity included in the force receiving member, wherein said circular cylindrical cavity has a cylindrical wall partially split into two halves and contains a circular cylindrical shell Piezo electric element therein in a squeezing arrangement; wherein a section of the force transmitting member is trapped between the two partially split halves of the cylindrical wall in a squeezed arrangement.

17. The combination as set forth in claim 16 wherein said combination includes two conductor wires respectively extending from two electrodes respectively included in inner and outer cylindrical surfaces of the circular cylindrical shell Piezo electric element.

18. The combination as set forth in claim 1 wherein the second cavity with a deflective wall containing a Piezo electric element comprises a gap between two partially split halves of the transducer retainer member divided from one another by a reference plane generally including the longitudinal axis of said elongated cavity included in the force receiving member, wherein said gap receives and retains a planar Piezo electric element in a compressing arrangement, and said planar Piezo electric element has two electrodes respectively included in the two opposite sides thereof and two conductor wires respectively extending from said two electrodes; wherein the force transmitting member extends from one of the two partially split halves of the transducer retainer member.

19. The combination as set forth in claim 1 wherein the second cavity with a deflective wall containing a Piezo electric element comprises a gap between two partially split halves of the transducer retainer member divided from one another by a reference plane generally including the longitudinal axis of said elongated cavity included in the force receiving member, wherein the force transmitting member extends from said one extremity of the transducer retainer member affixed to the container vessel and through the gap between two partially split halves of the transducer retainer member, and two gaps between the force transmitting member and the two partially split halves of the transducer retainer member respectively receive and retain two planar Piezo electric elements in compressing arrangement; wherein each of said two planar Piezo electric elements has at least one electrode included in one side thereof and at least one conductor wire extending from said one electrode.

20. The combination as set forth in claim 1 wherein the deflective wall of the second cavity containing a Piezo electric element comprises a deflective planar wall generally perpendicular to the longitudinal axis of said elongated cavity included in the force receiving member and anchoring the force transmitting member, and said a Piezo electric element comprises two halves of planar Piezo electric element respectively disposed on the two opposite sides of a reference plane generally including the longitudinal axis of said elongated cavity included in the force receiving member and pressed against the deflective planar wall; wherein each of the two halves of planar Piezo electric element includes at least one electrode included in one side thereof and at least one lead wire extending from said one electrode.

* * * * *